United States Patent [19]

Alm et al.

[11] Patent Number: 5,529,454
[45] Date of Patent: Jun. 25, 1996

[54] TRANSPORTING APPARATUS AND METHOD

[76] Inventors: Stephen D. Alm, 2802 Waterleaf Dr., Germantown, Tenn. 38138; Andrew J. Alm, 4183 Old Forest Rd.; John M. Cullum, 8308 Championship Dr. #301, both of Memphis, Tenn. 38125

[21] Appl. No.: 306,188

[22] Filed: Sep. 13, 1994

[51] Int. Cl.$^6$ .................................................. B60P 3/12
[52] U.S. Cl. ........................... 414/478; 414/494; 414/563
[58] Field of Search ........................ 414/471, 477–480, 414/491, 494, 498, 500, 563

[56] References Cited

U.S. PATENT DOCUMENTS

| | | |
|---|---|---|
| 2,259,279 | 10/1944 | Watter . |
| 2,357,784 | 9/1944 | Thompson et al. . |
| 2,410,902 | 11/1946 | Roberts . |
| 2,578,264 | 12/1951 | Raymick . |
| 2,588,001 | 3/1952 | Holland ................................. 414/477 |
| 2,786,590 | 3/1957 | Edwards et al. ...................... 414/477 |
| 2,928,558 | 3/1960 | Bamford et al. . |
| 3,117,765 | 1/1964 | Chiuzzi . |
| 3,198,538 | 8/1965 | Nowell . |
| 3,215,401 | 11/1965 | Grabarski . |
| 3,376,987 | 4/1968 | Lohse ................................... 414/477 |
| 3,430,792 | 3/1969 | Grove et al. . |
| 3,450,282 | 6/1969 | Ezolt . |
| 3,520,434 | 7/1970 | Destefan et al. . |
| 3,641,764 | 2/1972 | Destefan et al. . |
| 3,836,027 | 9/1974 | Gardner . |
| 3,929,237 | 12/1975 | Schaedler . |
| 3,951,280 | 4/1976 | Peck . |
| 4,125,198 | 11/1978 | Landoll . |
| 4,231,710 | 11/1980 | Landoll . |
| 4,239,275 | 12/1980 | Horneys et al. . |
| 4,264,262 | 4/1981 | Lo Codo . |
| 4,317,579 | 3/1982 | Louw . |
| 4,318,657 | 3/1982 | Znidaric . |
| 4,352,625 | 10/1982 | Bolderoff ............................ 414/494 |

(List continued on next page.)

FOREIGN PATENT DOCUMENTS

| | | | |
|---|---|---|---|
| 0362096 | 4/1990 | European Pat. Off. ................ | 414/478 |
| 2686843 | 8/1993 | France ................................... | 414/494 |
| 2690883 | 11/1993 | France ................................... | 414/563 |
| 1952641 | 4/1971 | Germany ............................... | 414/480 |
| 3003265 | 8/1981 | Germany . | |
| 3216752 | 11/1982 | Germany . | |
| 3124752 | 1/1983 | Germany . | |
| 3244244 | 7/1983 | Germany . | |
| 1230886 | 5/1986 | Russian Federation . | |
| 1164100 | 6/1985 | U.S.S.R. . | |
| 964936 | 7/1964 | United Kingdom . | |
| 8607019 | 12/1986 | WIPO .................................... | 414/494 |

OTHER PUBLICATIONS

Recovery Operator Jun. 1994.
Landoll Centerfold Brochure.
Landoll Print Ad.
Century Wrecker Corp Brochure.
Century Wrecker Corp Brochure Distributed by Elsenheimer Chevrolet.
Weld/Built Body Co., Inc. Brochure.
Challenger's Slide-Back Carriers Brochure.
Chevron Brochure.
Chevron Print Ad.

*Primary Examiner*—James W. Keenan
*Attorney, Agent, or Firm*—Thomas G. Scavone; Michael P. Mazza; Niro, Scavone, Haller & Niro

[57] ABSTRACT

An apparatus mountable to a transporting vehicle chassis for transporting another vehicle including a platform pivotally mounted to the chassis which includes a deck for carrying the vehicle, and a carriage located on and movable along the platform. A telescoping boom is connected to the carriage, and has a free end with a vehicle lift device, which engages the vehicle to be transported. Power actuators are provided to move the platform from a loading position to a transport position, and for moving the carriage and for raising or lowering the vehicle lift mechanism.

24 Claims, 11 Drawing Sheets

U.S. PATENT DOCUMENTS

| | | | |
|---|---|---|---|
| 4,353,597 | 10/1982 | Shoup . | |
| 4,361,191 | 11/1982 | Landoll et al. . | |
| 4,368,002 | 1/1983 | Krzyzosiak, Jr. . | |
| 4,456,420 | 1/1984 | Newhard . | |
| 4,483,549 | 11/1984 | Nikawa | 414/563 X |
| 4,492,507 | 1/1985 | Landoll et al. . | |
| 4,556,357 | 12/1985 | Landoll et al. . | |
| 4,673,328 | 6/1987 | Shiels . | |
| 4,704,063 | 11/1987 | Updike, Jr. et al. | 414/494 X |
| 4,750,856 | 6/1988 | Lapiolahti . | |
| 4,795,303 | 1/1989 | Bubik | 414/471 X |
| 4,854,803 | 8/1989 | Coccaro . | |
| 4,874,285 | 10/1989 | Bubik . | |
| 4,921,268 | 5/1990 | Dyer . | |
| 4,929,142 | 5/1990 | Nespor . | |
| 5,006,033 | 4/1991 | McConnell . | |
| 5,013,209 | 5/1991 | DeMichele et al. | 414/563 |
| 5,056,977 | 10/1991 | May . | |
| 5,061,147 | 10/1991 | Nespor . | |
| 5,156,238 | 10/1992 | Matthews . | |
| 5,246,329 | 9/1993 | Farrell | 414/478 |
| 5,249,909 | 10/1993 | Roberts et al. | 414/477 X |

TRANSPORTING APPARATUS AND METHOD

BACKGROUND OF THE INVENTION

The present invention relates to a transporting apparatus and method and, more particularly, to a vehicle transporting apparatus, commonly called a "car carrier," which is capable of transporting one or more vehicles in a damage-free manner.

In recent years, the towing industry has experienced a growing interest in vehicle transporting equipment that is versatile in use and capable of carrying a vehicle without risk of damage. As a result, a ;specific class of equipment, known as car carriers, has become increasingly popular. Such equipment typically includes a platform or deck carried on a truck chassis. The deck is capable of movement from a generally horizontal transport position, over the rear wheels of the truck, to a loading position, in which the deck extends rearwardly from the truck chassis and is downwardly inclined to the ground. In this latter loading position, the deck forms a ramp on which the vehicle to be towed is placed, either by driving it under its own power, by winching, or by other conventional techniques. Examples of such prior art car carriers are shown in U.S. Pat. Nos. 4,795,303; 4,556,357; 4,368,002; 4,239,275; and 3,450,282. U.S. Pat. No. 4,795,303 is hereby incorporated by reference into this application.

There are several disadvantages associated with known prior art car carriers. For example, if the ramp angle (that is, the angle between the deck when in a loading position, and the ground), is relatively large, serious problems may arise. Today's low-profile automobiles can be easily damaged if their lower chassis or body parts engage the deck due to the deck rising too abruptly from ground level. This is likely to occur when the vehicle is winched or otherwise transported up the deck of a car carrier with a relatively large ramp angle.

In other prior art units, the means employed to engage and load a vehicle (such as a J-hook or V-chain) are attached to the vehicle frame or axle, and can damage portions of the vehicle chassis. The winch cable used to load the vehicle onto the deck can cause damage to the underside of the vehicle, as well. Moreover, the chains or slings typically used to engage and load the vehicle require the operator to get down and under the vehicle. This is awkward, time consuming and potentially dangerous.

A still further disadvantage encountered with prior art car carriers is that no effective means has been provided to assist in loading vehicles in which the rolling wheels have been offset or axles have been damaged, or where the tires are flat. As a result, when a vehicle with offset wheels is winched onto the inclined deck, the vehicle has a tendency to move laterally, and it is often difficult to properly position the vehicle in the center of the deck.

Another disadvantage associated with the prior art relates to the means typically used to secure the vehicle to the deck. Operators often use chains attached to the rear of the vehicle in addition to the winch cable hooked to the front. If the winch cable is over-tightened severe frame damage may result.

Yet another disadvantage of the prior art car carriers is the requirement that they be positioned directly in line with the vehicle. This causes problems if, for example, the vehicle is located in close quarters or adjacent to some obstruction.

SUMMARY OF THE INVENTION

The present invention preserves the known advantages of prior art car carrier transporting devices. In addition, it provides new advantages not found in currently available car carriers and overcomes many of the disadvantages of such currently available devices, including those discussed above.

The invention is generally directed to a vehicle transporting apparatus that combines a vehicle lifting system with a car carrier, and includes unique structural features to facilitate the use of such a combination in circumstances and under a wide variety of conditions previously unattained by car carrier transporting devices. The unique combination apparatus of the present invention addresses the need for damage-free towing both when the vehicle is engaged or "hooked up" and when the vehicle is loaded and transported.

In one preferred embodiment, the transporting apparatus of the present invention includes a vehicle chassis and a platform pivotally mounted to the chassis; the platform includes a deck for carrying the transported vehicle. A carriage is mounted on and movable along the platform. A telescoping boom is connected to the carriage, and has a rearward, distal end which supports a wheel lift towing device adapted for engaging and securing the wheels of the vehicle. A power actuator, such as a winch and cable, is provided to move the carriage, boom and wheel lift device, with the vehicle, along the platform. A second power actuator, such as hydraulic cylinders, is adapted to rotate the boom and wheel lift device, to thereby raise the transported vehicle to clear the rear portion of the platform during loading. Further power actuators move the platform from a loading position to the transport position.

A further feature of this embodiment is the use of a wheel lift device which includes a support beam pivotally connected to the boom, two collars pivotally attached to opposing ends of the support beam, and a pair of wheel retainer arms, each of the arms being associated with a corresponding collar. The use of pivoting collars, mounted to opposing ends of a support beam, allows the wheel retainer arms to be both horizontally and vertically moveable, facilitating the engagement and securing of the wheels of a disabled vehicle.

In another preferred embodiment, rather than a wheel lift device, the support beam can include any number of different structures adapted for different uses. For example, the support beam may be configured to engage the vehicle's frame or body, or to accommodate other loads by means of a fork-lift type receiver, for lifting pallets, or a flat platform, for lifting other objects.

In still another preferred embodiment, a platform with a complete deck need not be used; rather, only a partial deck is employed. In this embodiment, the front of the transported vehicle is supported solely by the vehicle lifting apparatus while the rear wheels are supported by a partial deck located toward the rear end of the platform.

In another preferred embodiment of the invention, a method for loading a vehicle using a car carrier system is provided. The method of the present invention embodies the steps of locating a platform in angled orientation adjacent the vehicle to be transported; engaging one end of the vehicle with a vehicle lifting device; rotating the vehicle lifting device to raise the vehicle at one end adjacent to the angled platform; moving the carriage-mounted lifting device with the vehicle up onto the platform; and then rotating the platform into a horizontal, vehicle-transporting orientation. The method of the present invention may also include the step of adjusting the orientation of the vehicle relative to the angled platform as it is moved onto the platform to prevent damage to the underportions of the vehicle.

BRIEF DESCRIPTION OF THE DRAWINGS

The novel features of the invention are set forth in the appended claims. The invention itself, however, together with further objects and attendant advantages thereof, will be best understood by reference to the following description taken in connection with the accompanying drawings in which:

DETAILED DESCRIPTION OF THE PREFERRED EMBODIMENTS

Figure 1:
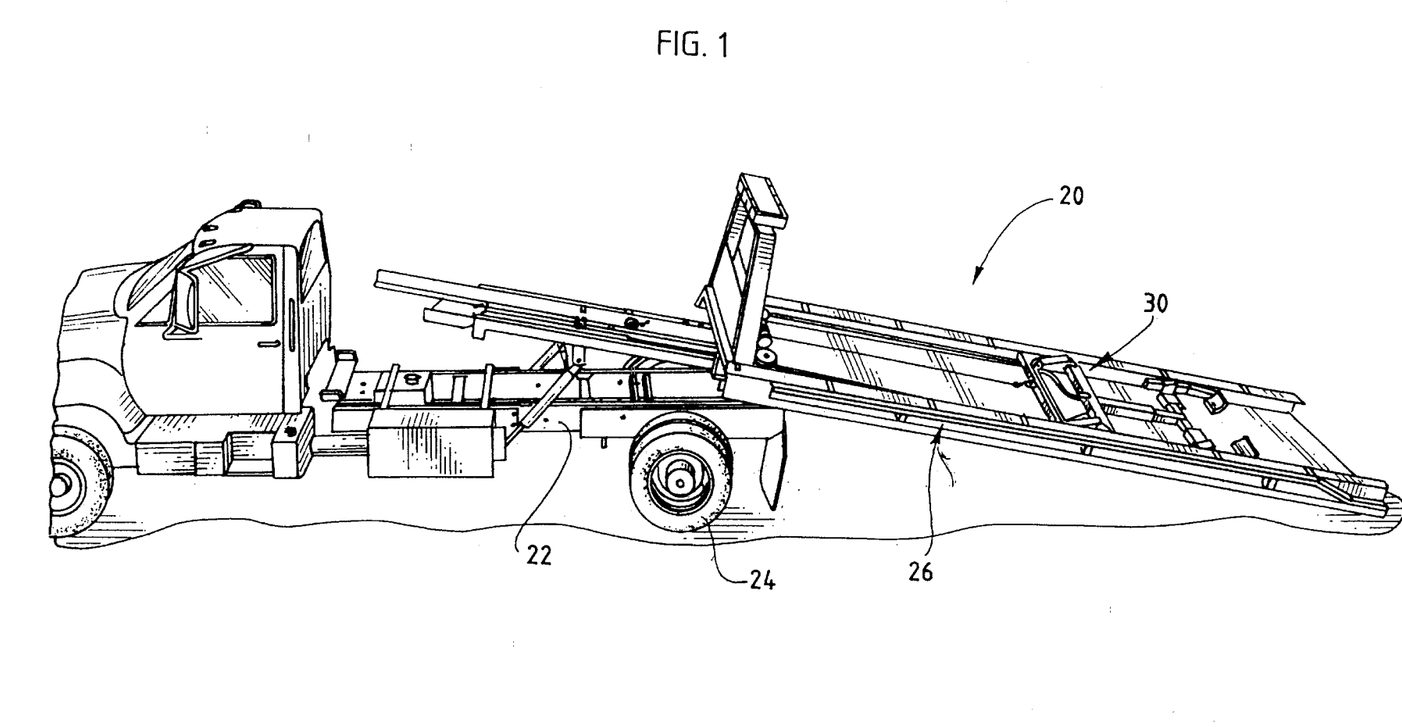
FIG. 1 is a perspective view showing one embodiment of the transporting apparatus of the present invention in the loading position.
Figure 2:
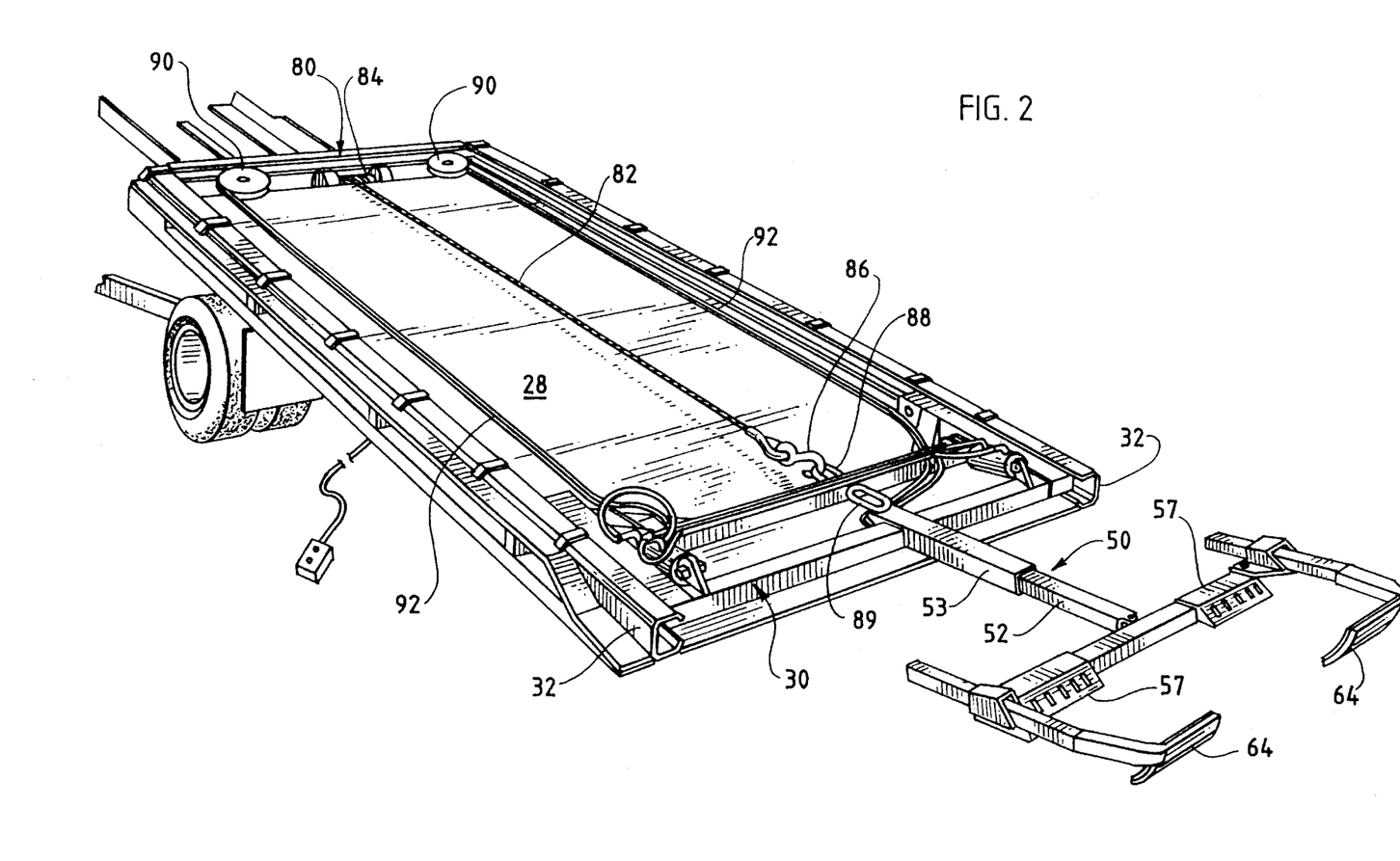
FIG. 2 is a rear perspective view of the transporting apparatus shown in FIG. 1.

With reference to the drawings and particularly FIGS. 1 and 2, one preferred embodiment of the transporting apparatus of the present invention, designated generally as 20, is shown as it is typically installed onto a transporting vehicle having a chassis 22 and rear wheels 24. The apparatus 20 includes a platform 26 having a deck 28. The platform is mounted in such a manner, as described more fully, for example in U.S. Pat. No. 4,795,303, to permit movement between several different operating positions. Of course, a variety of other mechanical, electrical and hydraulic arrangements well known to those of ordinary skill in the art may be employed to mount the platform 26 to chassis 22. Any of these well known structures or arrangements may be useful in adapting the present invention to conventional transporting vehicles.

The apparatus of the present invention also includes a carriage 30, which is moveable along rails 32. Carriage 30, illustrated more fully in FIGS. 3–6, includes front brace 44, rear brace 46, and side braces 47. (Throughout this specification, the terms "front" or "forward" denote a direction toward the cab of the transporting vehicle and "rear" or "rearward" denote a direction away from the cab.) Two sets of carriage wheels 34 mounted on side braces 47 roll within the "C" channel cross-sections of guide rails 32, which extend along the periphery of the deck and permit the carriage to move up or down the deck. The carriage side wheels 35 are fixed to the outer portion of side braces 47, abut the inner surfaces of guide rails 32, and thus prevent the carriage from swaying or cocking as it moves along the deck 28. Carriage wheels 34 abut the top and bottom portions, 32' and 32", respectively, of guide rails 32. Thus, vertical forces are transmitted from the carriage 30 to guider rails 32 by means of wheels 34, and horizontal or transverse forces are transferred from the carriage to the guide rails by means of wheels 35. A releasable stop (not shown) may be provided on the guide rails at a rearmost portion of the deck, to ensure that the carriage does not inadvertently disengage from the guide rails.

The wheel lift apparatus illustrated in the preferred embodiments of the present invention is designated generally as 51. Rear brace 46 of the carriage supports a telescoping boom 50. Boom 50, comprising inner boom member 52 and outer boom member 53, may be extended or retracted by cylinder 54. Inner boom member 52 is centrally, pivotally attached to a transverse crossarm or support beam 55 at pivot pin 56. Shoes 57 cover opposing outer ends of support beam 55. Tapering collars 60 are pivotally attached to the opposing ends of shoes 57, and permit both horizontal and vertical movement of associated wheel retainers 62. Wheel retainers 62 include wheel plates or grids 64, which can either be curved or straight. Further details of one wheel lift device suitable for use in the present invention are disclosed in U.S. Pat. Nos. 4,637,623 and 4,798,509, each of which is incorporated herein by reference.

As noted above, vehicle lifting structures other than wheel lifting device 51 are contemplated in the practice of the present invention. For example, frame-engaging or axle-engaging forks, or even body-engaging devices, all well known to those of skill in the art, may be employed. However, a wheel-engaging apparatus is preferred since it will typically minimize potential damage to the transported vehicle.

Figures 3, 4:
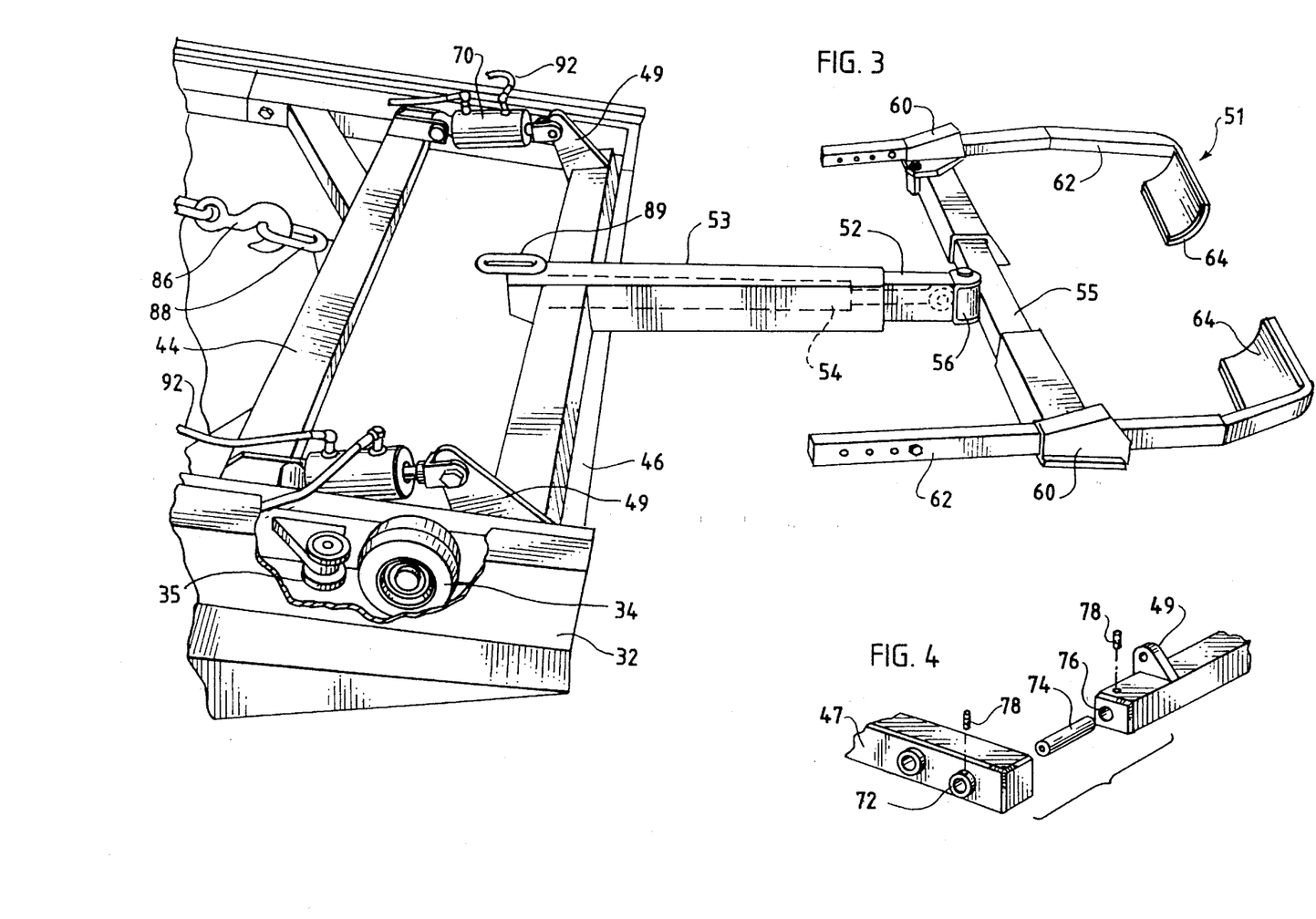
FIG. 3 is a partial perspective view of the apparatus illustrated in FIG. 1 showing further details of the transporting apparatus, carriage, and wheel lift.
FIG. 4 is an exploded perspective view illustrating details of construction of the carriage embodied in the apparatus illustrated in FIG. 1.
Figure 5:
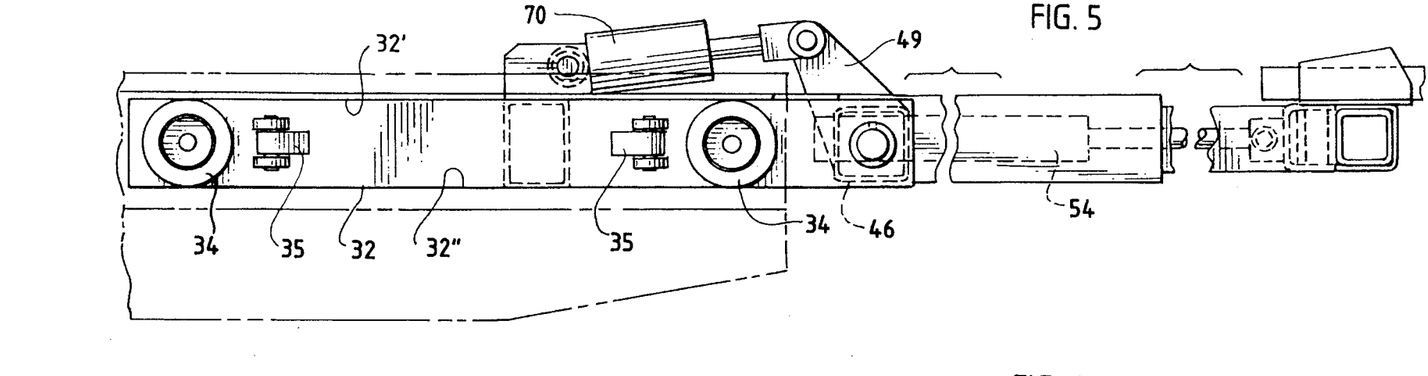
FIGS. 5 and 6 are partial side elevation and plan views, respectively, each illustrating further details of the platform, carriage, wheel lift device and powered actuators useful in the embodiment illustrated in FIG. 1.
Figure 6:
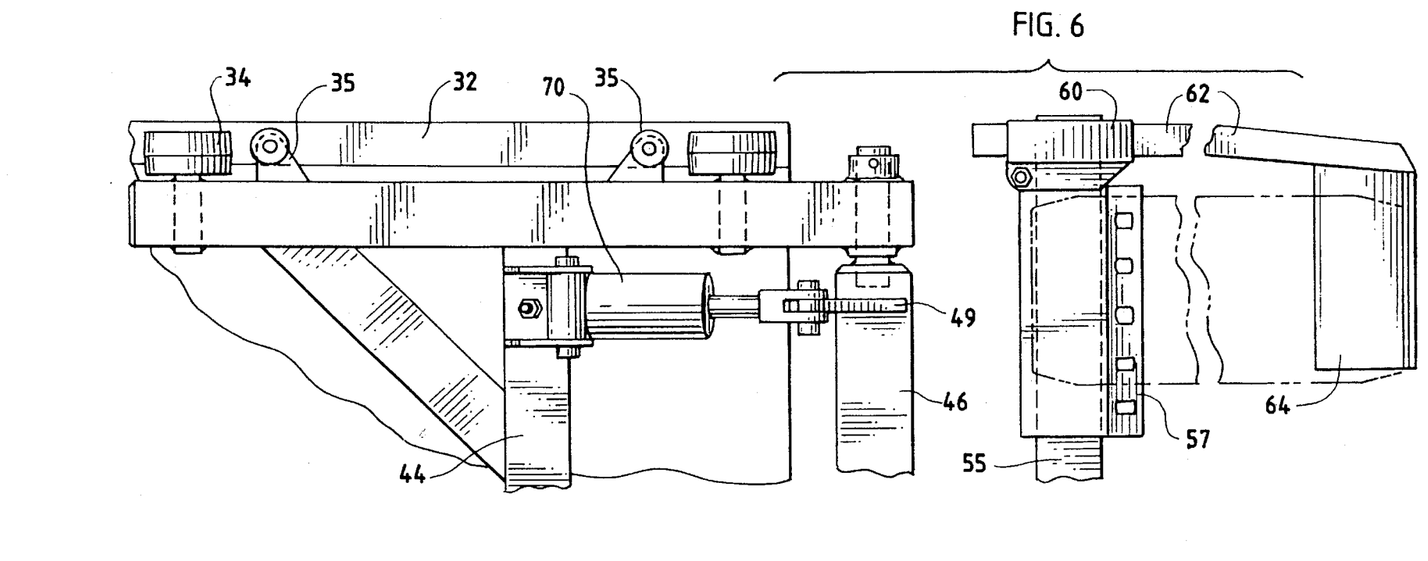
Figure 7A:
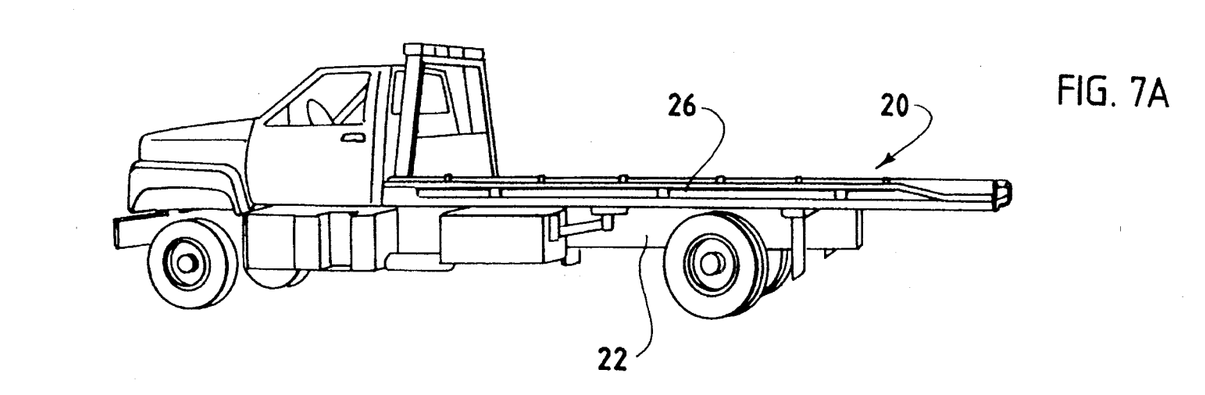
FIGS. 7A through 7H are side elevational views illustrating the sequence steps to be followed in loading a vehicle for transport.
Figure 7B:
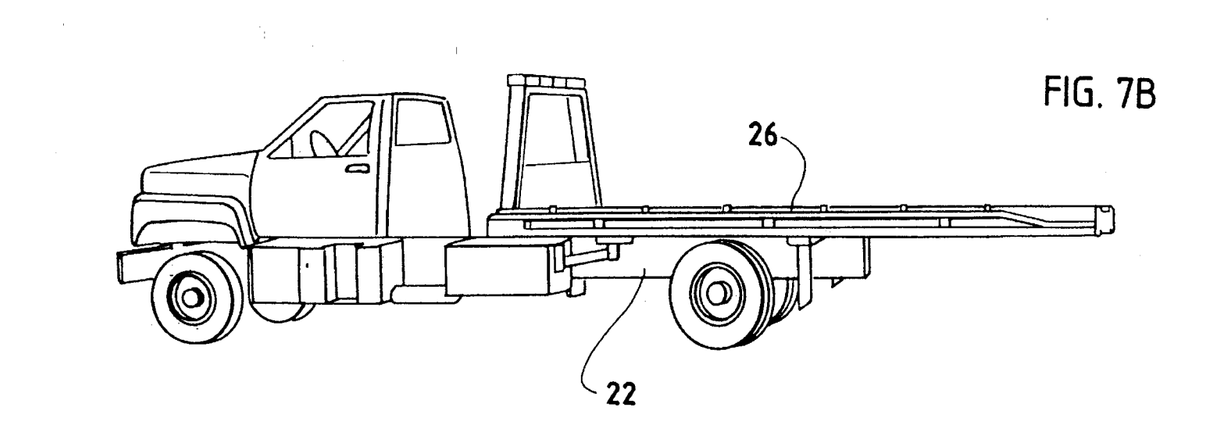
Figure 7C:
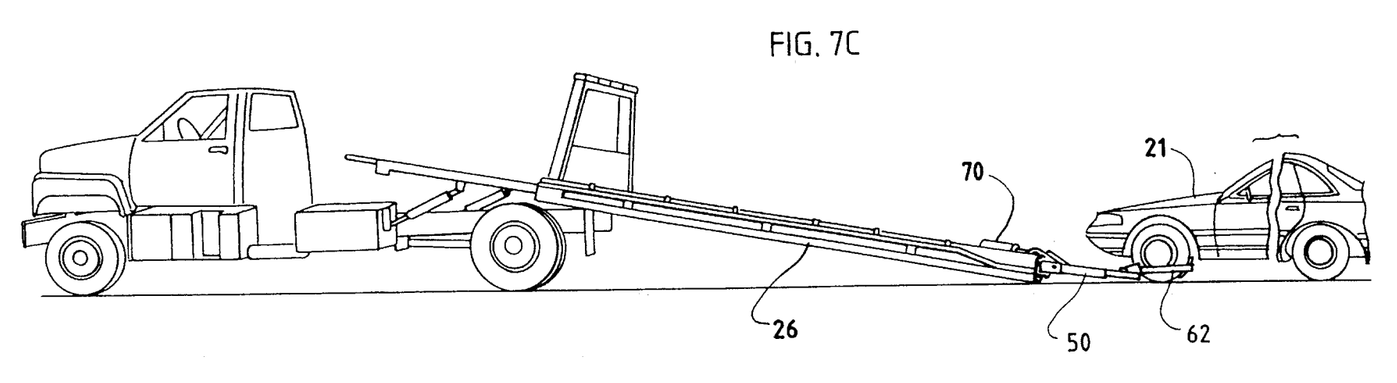
Figure 7D:
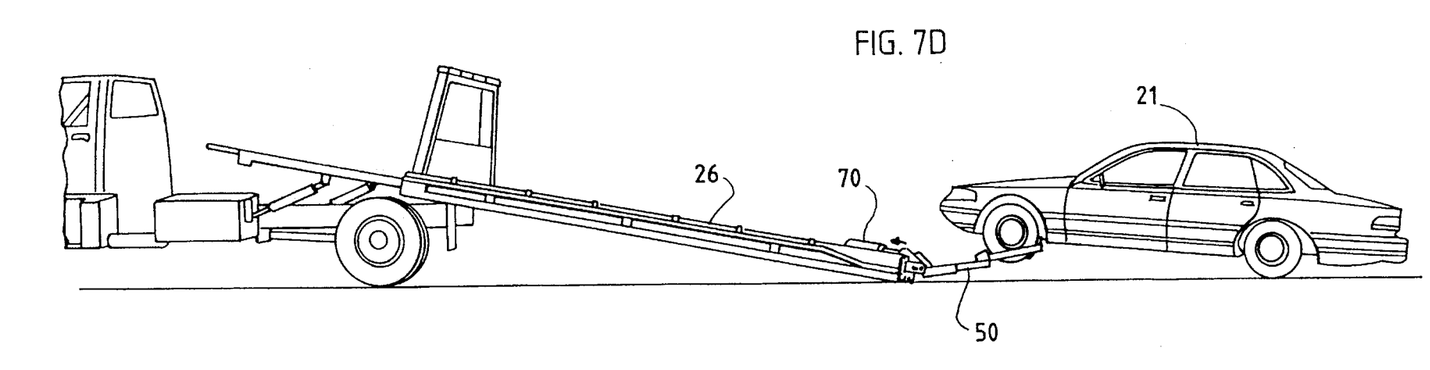
Figure 7E:
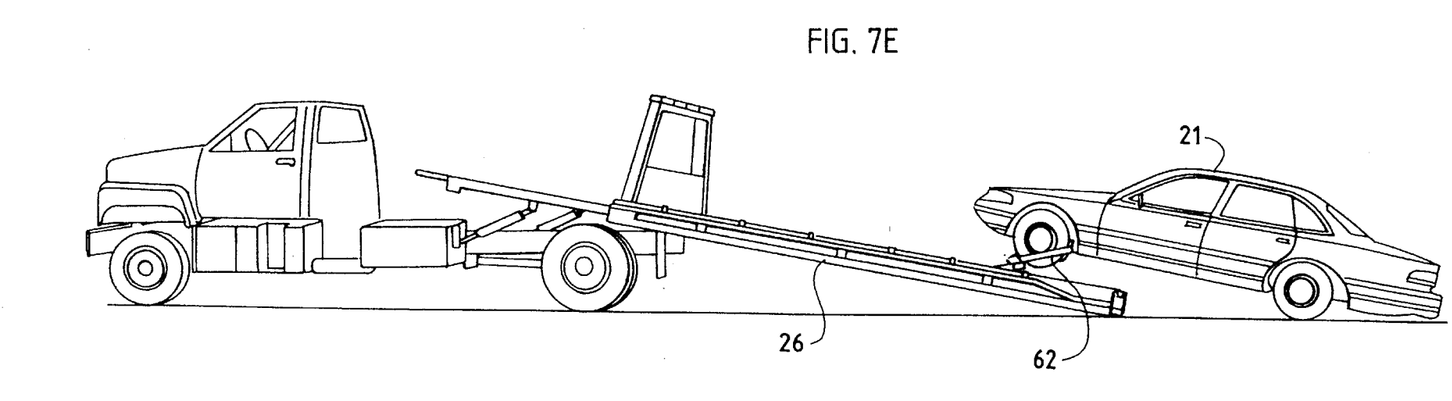
Figure 7F:
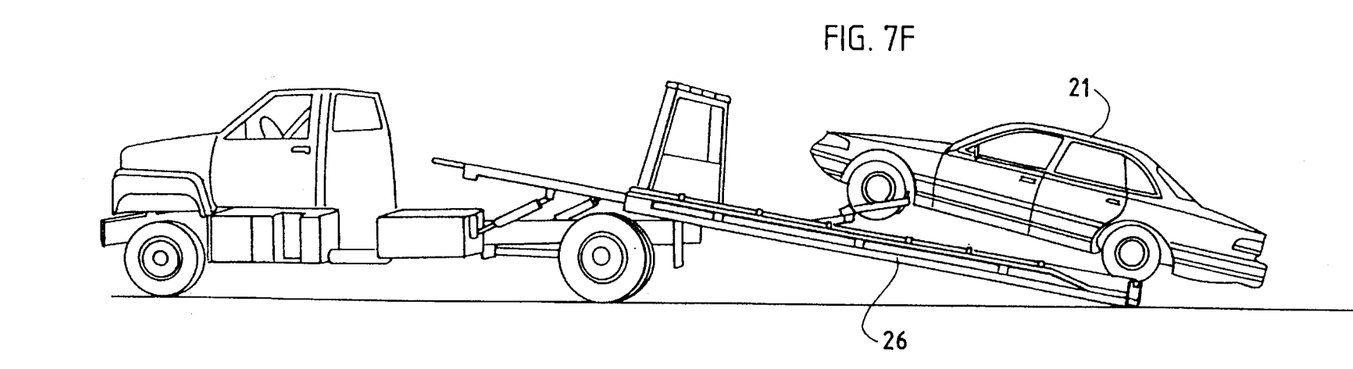
Figure 7G:
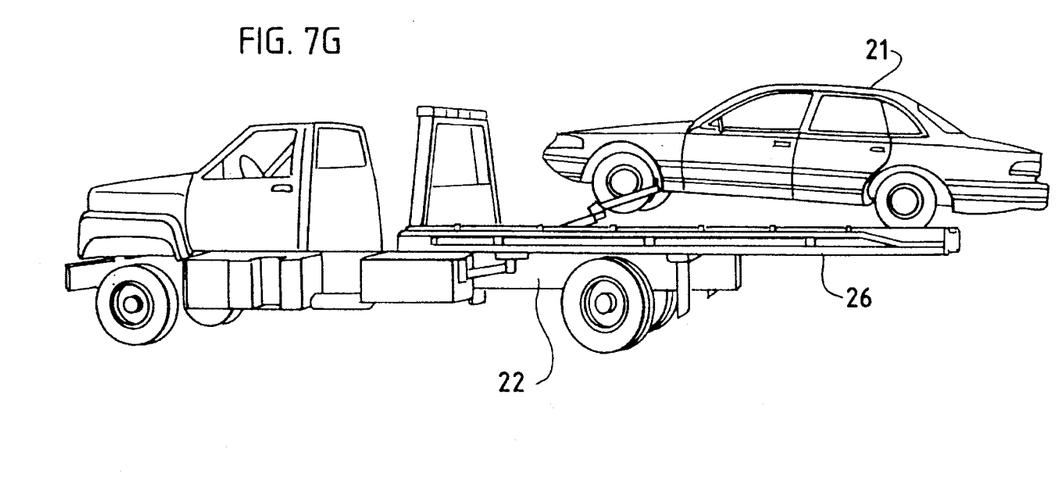
Figure 7H:
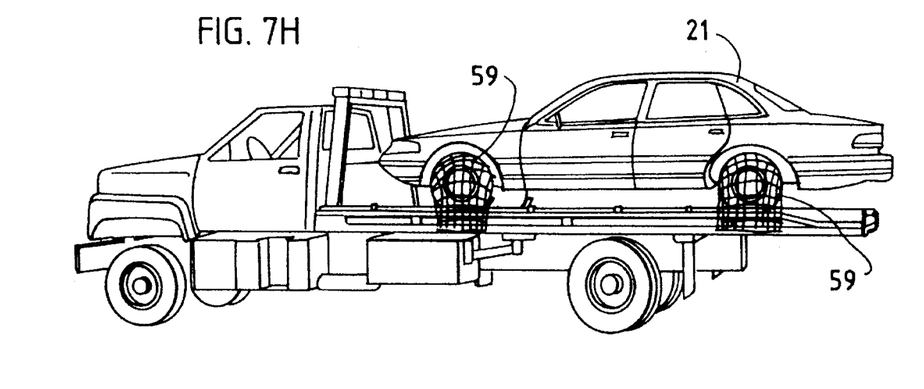

Boom 50 is rotatable so that the vehicle may be raised during loading. To that end, and as shown in FIGS. 3 and 4, cylinders 70 are fixed to front brace 44 at one end, and are fixed to flange 49 on rear brace 46, at their other end. Sleeve 72 is provided within side rail 47. Rear brace 46 is pivotally connected to side rail 47 by pin 74, which is also journalled within a corresponding aperture 76 in rear brace 46. Set pins 78 are insertable into sleeve 72 and rear brace 46, as shown, to fix pin 74 in position. The structure shown in FIG. 4 is of course symmetrical, and identical structure is located on the opposing side of the carriage 30. Thus, as should now be understood, as cylinders 70 retract, flanges 37, rear brace 46 and its associated boom 50 are rotated about pivot pin 74, thereby raising or lowering wheel lift assembly 51.

Winch 80 is positioned at the front portion of platform 26 and includes cable 82 and drum 84. The rear end of cable 82 is fixed to hook 86 or another connecting device, which in turn can be secured to either ring 88 on front brace 44, or ring 89 on rear brace 46. As the winch 80 is activated, the carriage 30 is drawn up deck 28.

Figure 8:
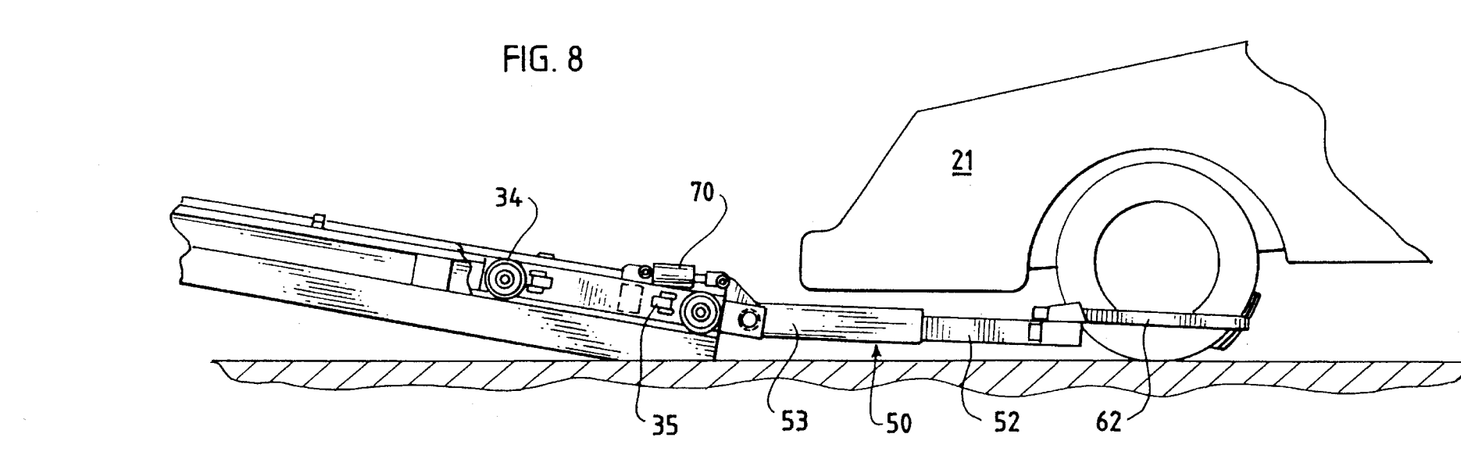
FIGS. 8 through 11 illustrate the manner in which the apparatus illustrated in FIG. 1 engages the wheels of a vehicle to be transported and how the wheel lift device together with the vehicle are manipulated to properly position the vehicle in the proper transport position.
Figure 9:
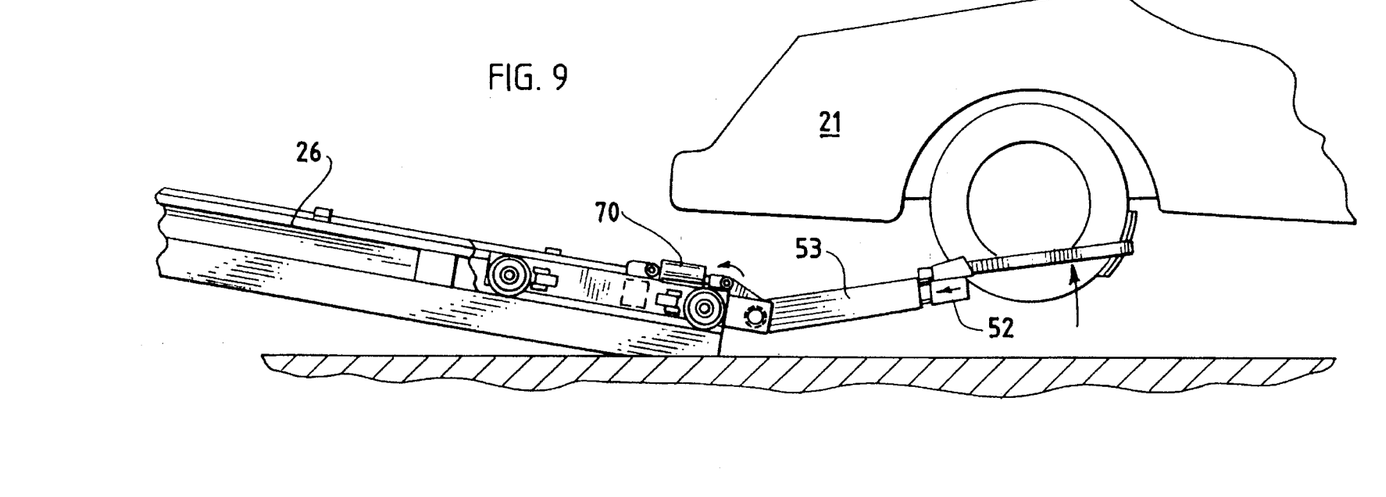
Figure 10:
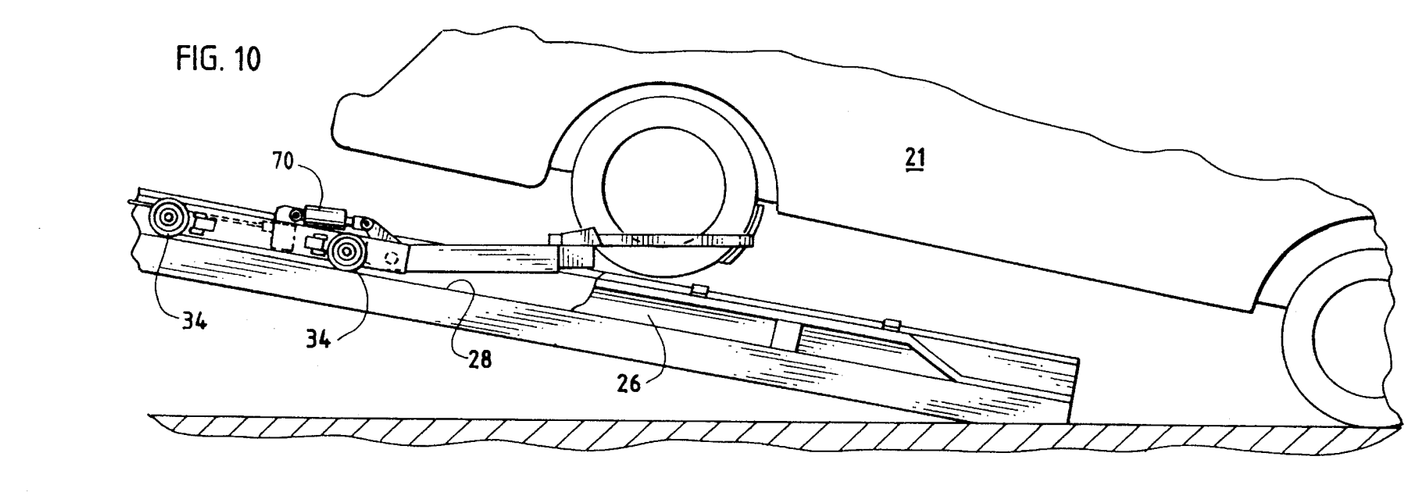
Figure 11:
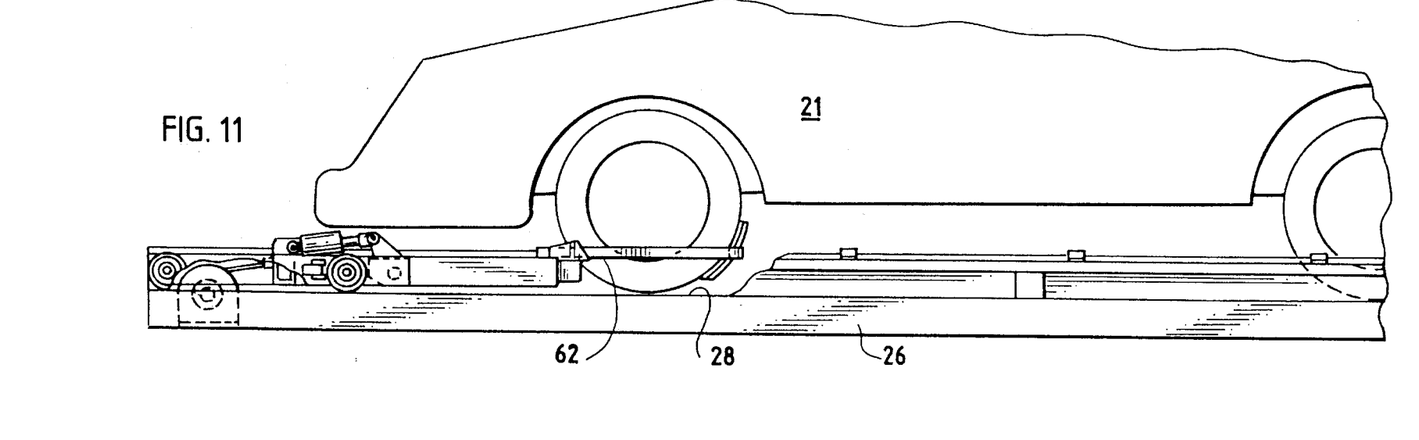

The operation of the apparatus constructed as described above is simple and straightforward and is illustrated in FIGS. 7–11. FIGS. 7A and 7B show the transporting apparatus first in its stowed or transport position and then as the platform 26 moves rearward off the chassis 22. FIGS. 7C and 8 show the platform 26 in the vehicle loading position with boom 50 extended so that wheel retainers 62 may be located in a vehicle lifting position adjacent to the wheels of the vehicle 21 to be transported. Boom 50 is then rotated upwardly, through the action of cylinders 70, as illustrated in FIGS. 7D and 9, raising wheel lift assembly 51 and vehicle 21. This pivoting movement assures that the lowermost front portion of vehicle 21 clears the rear portion of deck 28 as vehicle 21 is loaded for transport. Boom 50 can then be retracted so that inner boom 52 is moved forward relative to outer boom 51. Now, winch 80 is actuated and carriage 30 moves up platform 26, along with wheel lift assembly 51 and vehicle 21, as illustrated in FIGS. 7E, 7F and 10. At an appropriate location on the deck, once the lowest portion of the front Of the vehicle 21 has cleared the rear of the deck, boom 50 can be permitted to rotate downward so that the front wheels of the vehicle move closer to the deck. This rotation of the vehicle will, in turn, raise the rearmost portion of vehicle 21 to prevent contact with the ground or pavement and concomitant damage. When vehicle 21 has been moved completely on board deck 28, winching ceases, the wheel lift 51 is rotated to lower the vehicle's wheels in contact with deck 28, and platform 26 is pivoted to a generally horizontal position and retracted, placing the vehicle in the transport position, as shown in FIGS. 7G, 7H and 11. Preferably, the vehicle 21 is then further secured to platform 26 and deck 28 by means of suitable netting or straps 59 well known to those of ordinary skill in the art.

Figure 12:
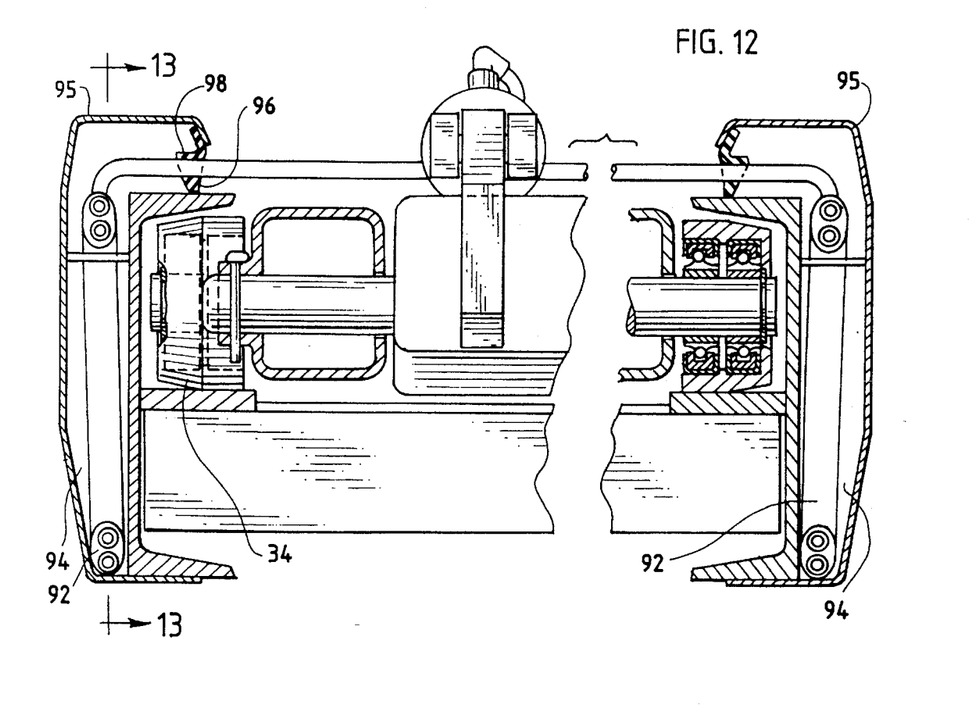
FIGS. 12 through 14 illustrate in transverse and longitudinal cross sections, further details of the carriage and platform structures forming another preferred embodiment for placement and protection of hydraulic lines necessary to operate the wheel lift device.
Figure 13:
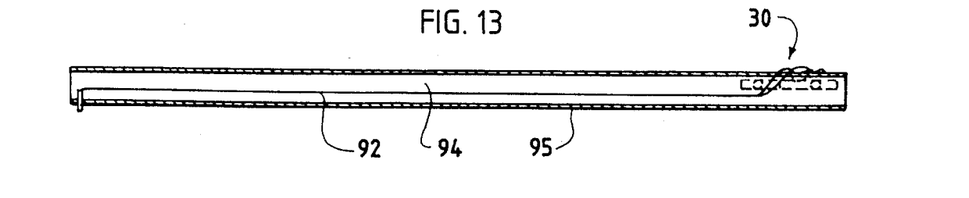
Figure 14:
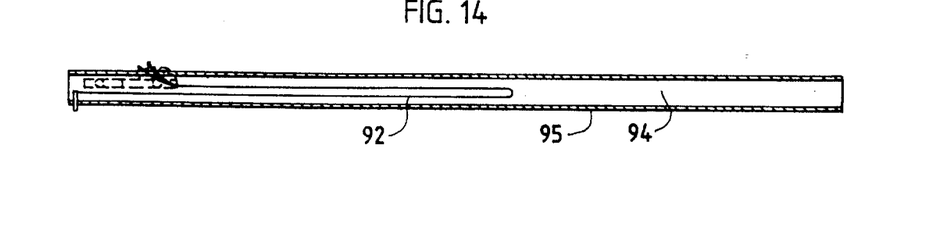

Those of skill in the art will appreciate that the carriage 30 requires hydraulic circuitry connected to cylinders 54 and 70 that can move with carriage 30 along platform 26. Different structures can achieve that goal. For example, FIGS. 1 and 2 illustrate one embodiment utilizing a pair of hydraulic hose reels 90 that play out the necessary hydraulic line 92 as the carriage 30 moves rearward on platform 26. As the carriage moves forward, the reels 90 take up the excess line 92. Alternatively, as illustrated in FIGS. 12–14, hydraulic lines 92 may be threaded in respective side compartments 94 formed by side bumpers 95 extending along the entire length of each side of platform 26. As can be seen in FIG. 13, when the carriage 30 is positioned at the rearward end of platform 26, the hydraulic lines 92 extend linearly along the entire length of compartment 94. As the carriage 26 moves toward the front end of platform 26, hydraulic lines 92 fold over, forming a loop as illustrated in FIG. 14. The hydraulic lines 92 emerge from compartments 94 along an inwardly facing, longitudinally extending slot 96 that runs the length of each compartment. Preferably, the slot 96 is covered by a flexible rubber shield 98 which impedes dirt or other contaminants from entering compartment 94. Of course, because of the use of a flexible shield material, the hydraulic lines can extend through the slot while maintaining the shield in a generally closed position along the remaining length of slots 96.

Those of ordinary skill in the art will understand that carriage 30 described here is only one embodiment of the present invention. Different structures, trolleys or carriages in other diverse forms, can be used and still accomplish many, if not all, of the objectives of the present invention. So too, other means can be used to move the carriage. For example, a chain and sprocket drive may be employed. Alternatively, a screw drive, hydraulic actuators, gear and pinion or other drive means may be used to move the carriage, or a structure accomplishing its function, along the deck. It is also contemplated that the carriage 30 may be removed from platform 26 to permit use as a conventional carrier.

From the foregoing description of the preferred embodiments, those of skill in the art will appreciate that the present invention overcomes a number of disadvantages with prior art car carriers. For example, the operator need not crawl under the transported vehicle to hook up the carrier. Rather, the wheel retainers 62 may be easily positioned in vehicle-lifting position adjacent the wheels from the sides of vehicle 21. The simplicity and efficiency of hook-up is also a safety consideration, because it minimizes the time when the operator may be in a potentially dangerous location, i.e., along a highway roadside. Moreover, the use of a pivotable, vehicle-engaging cross-arm 55 allows "off-line" positioning of the carrier for hook up where, due to close quarters, the traditional "on-line" hook-up position would not be possible.

Another significant advantage arising from the present invention is the reduction of potential damage to the transported vehicle. By raising the front end of the vehicle and moving the carriage and raised vehicle along the platform and deck, the transported vehicle cannot scrape the deck even when there is a relatively large ramp angle. So too, because the winch cable connects to the carriage in front of the vehicle, there is little possibility of winch cable damage.

Off-center loading problems are also solved by the present invention since the forward wheels of the transported vehicle do not roll along the deck during loading, and offset, flat or otherwise non-functioning wheels will not interfere with proper positioning of the vehicle.

Of course, it should be understood that various changes and modifications to the disclosed preferred embodiments will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. A transporting apparatus for carrying a transportable vehicle having at least two pairs of wheels, comprising:

a transporting vehicle having a chassis;

a platform pivotally mounted to the chassis and including a deck;

a carriage movably mounted to the platform and operable along the deck;

a vehicle lift device operably connected to and extending rearwardly of the carriage for Initially engaging one of the pairs of wheels of the transportable vehicle at a location in which the vehicle lift device is rearwardly displaced from the platform;

a first power actuator to move the carriage and vehicle lift device along the deck to load the transportable vehicle onto the deck; and a second power actuator to pivot the vehicle lift device relative to the platform and to raise or lower the vehicle lift device at selected locations along the deck to facilitate loading of the transportable vehicle.

2. The transporting apparatus of claim 1, further comprising a third power actuator adapted for pivotally moving the platform relative to the chassis of the transporting vehicle between loading and transporting positions.

3. The transporting apparatus of claim 1, wherein the first power actuator includes a winch and cable.

4. The transporting apparatus of claim 3, wherein the winch cable connects directly to the carriage forward of the transportable vehicle.

5. The transporting apparatus of claim 1, wherein the vehicle lift device is a wheel lift device comprising a cross arm pivotally connected to a rearwardly extending boom, two collars pivotally attached to opposing ends of the cross arm, and a pair of wheel retainer arms, each of the arms being associated with one collar.

6. The transporting apparatus of claim 5, wherein each of the wheel retainer arms is removable from its associated collar.

7. The transporting apparatus of claim 5, wherein the cross arm is located rearwardly of the carriage.

8. The transporting apparatus of claim 1, wherein the carriage includes rollers mounted at opposing sides of the carriage, the platform includes a pair of opposing side rails, and the carriage rollers cooperate with the rails and thereby facilitate movement of the carriage.

9. The transporting apparatus of claim 1, wherein the second power actuator includes at least one hydraulic cylinder mounted on the carriage and adapted for rotating at least a rear portion of the carriage together with the vehicle lift device.

10. The transporting apparatus of claim 9, wherein the platform includes side compartments for housing hydraulic conduits associated with the first or second power actuators.

11. The transporting apparatus of claim 1, wherein the second power actuator is associated with the carriage.

12. A car carrier towing apparatus operable between loading and transport positions for transporting a vehicle positioned rearward of the car carrier during loading, comprising:

a chassis;

a platform pivotally mounted to and rearwardly extendable from the chassis and including a deck for carrying the vehicle;

a carriage mounted for movement along the platform;

a boom connected to the carriage and positionable rearward of the platform, the boom having a free end extending rearwardly of the carriage for engaging the vehicle during loading at a position rearwardly displaced from the deck;

a first power actuator for extending and pivoting the platform;

a second power actuator for moving the carriage and boom, together with the engaged vehicle, along the platform; and a third power actuator for selectively rotating the boom relative to the platform during movement of the vehicle along the platform.

13. An apparatus for transporting a towable vehicle having a suspension system and at least two pairs of, comprising:

a transporting vehicle having a chassis;

a platform mounted on the chassis, the platform having a longitudinal length terminating in front and rear ends, and being rearwardly extendable and pivotable relative to the chassis;

carriage means mounted on the platform, the carriage means being movable along the platform between the front and rear ends;

a rearwardly extending boom mounted to the carriage means, the boom being vertically movable relative to the platform and having a vehicle engaging support extending rearwardly of the carriage means, the vehicle engaging support being operable to initially lift one of the pairs of wheels of the towable vehicle while the vehicle engaging support is rearwardly displaced from the platform, thereby permitting the towable vehicle to ride on its own suspension system;

a first powered actuator to move the carriage means at least in a forward direction toward the front end of the platform; and a second powered actuator to pivot the boom relative to the platform between a lowered, horizontal position and a raised position relative to the platform.

14. The transporting apparatus of claim 13, wherein the vehicle engaging support is a wheel lift device including a cross beam pivotally connected to the rearwardly extending beam, two collars pivotally attached to opposing ends of the cross beam, and a pair of wheel retainer arms, each arm being associated with one collar.

15. An apparatus for transporting a vehicle, comprising:

a towing vehicle with a chassis;

a rearwardly extendable and pivotable platform mounted on the chassis;

a carriage, mounted to move longitudinally on the platform;

a vertically moveable and rearwardly extending boom mounted to the carriage;

vehicle engagement members mounted to the boom for engagement with the vehicle at a location rearwardly displaced from the platform;

a first powered actuator to move the carriage longitudinally along the platform; and a second powered actuator to pivot the boom relative to the platform.

16. A vehicle transporting apparatus comprising:

at least one longitudinally extending rail having forward and rearward ends and mountable to a chassis of a transporting vehicle, the rail being movably mountable to the chassis to permit movement between loading and transport positions;

a carriage riding on the at least one rail;

a vehicle lift operably connected to the carriage and including a rearwardly extending boom with a vehicle-engaging member at its rearward free end, the rearward free end of the vehicle-engaging member extending rearwardly of the carriage and being engageable to one end of a transportable vehicle while being rearwardly displaced from the rail;

a first power actuator associated with the carriage to pivot at least a portion of the carriage and to thereby raise the forward end of the vehicle lift and the one end of the transportable vehicle engaged by the vehicle-engaging member;

a second power actuator to move the carriage, together with the vehicle lift and the one end of the raised vehicle, to a position adjacent the forward end of the at least one rail; and a third power actuator to move the at least one rail between the loading and transport positions.

17. A method for loading a vehicle having at least one pair of wheels using a car carrier towing system, comprising the steps of:

positioning a towing vehicle adjacent the vehicle to be loaded, the towing vehicle including an inclined platform;

engaging the vehicle to be loaded using a wheel lift device associated with and positioned rearward of the platform, the wheel lift device including a rearwardly extending boom and being operable to lift one pair of the at least one pair of wheels of the vehicle to be loaded while the wheel lift device is rearwardly displaced from the platform;

moving the wheel lift device along the platform in a forward direction toward the towing vehicle;

selectively rotating the wheel lift device during movement of the wheel lift device along the platform so that the vehicle to be loaded is moved to desired raised or lowered positions; and rotating the platform to a vehicle transporting position, in which the platform and the loaded vehicle are generally horizontal.

18. A method of transporting a vehicle having first and second pairs of wheels, comprising:

positioning a transporting apparatus having a rearwardly extendable and pivotable bed in generally longitudinal alignment with the vehicle;

extending the bed rearwardly and pivoting the bed into an inclined orientation adjacent one end of the vehicle;

engaging the vehicle at a location rearwardly displaced from the bed and lifting the one end of the vehicle by engagement only with the first pair of wheels nearest to the bed;

moving the vehicle forwardly toward and onto the inclined bed with the one end of the vehicle and the first pair of wheels in the raised position;

lowering the one end and the first pair of wheels of the vehicle from the raised position toward the bed as the vehicle is moved toward a loaded position on the bed;

continuing to move the vehicle forwardly along the inclined bed until the second pair of wheels rests on the bed and the vehicle is thereby placed in a loaded position; and pivoting the bed with the loaded vehicle thereon until the bed is in a generally horizontal position.

19. The method of claim 18 for transporting a vehicle, wherein the act of lifting the one end and the first pair of wheels of the vehicle includes the use of a vehicle lift mechanism for engaging the first pair of wheels of the vehicle while the vehicle lift mechanism is rearwardly displaced from the bed.

20. A car carrier towing apparatus for transporting a vehicle, comprising:

a pair of longitudinally extending side tracks having forward and rearward ends and being movably mountable to the rear of the towing apparatus to permit movement between loading and transport positions;

a carriage movable along the side tracks and including a crossbeam transversely extending between the side tracks, at least a portion of the carriage being rotatable with respect to the side tracks;

a power actuator for moving the carriage along the side tracks; and a vehicle lift device connected to and extending rearwardly of the carriage for operably engaging the vehicle at a location rearwardly displaced from the side tracks, whereby the vehicle lift device may raise or lower the vehicle upon actuation of the rotatable portion of the carriage.

21. The car carrier towing apparatus of claim 20 for transporting a vehicle, further comprising rollers connected to the carriage and operably associated with the side tracks for carrying vertical and lateral loads from the vehicle during loading while facilitating movement of the carriage along the side tracks.

22. The car carrier towing apparatus of claim 20 for transporting a vehicle, further comprising hydraulic controls connected to the cross-beam and including hydraulic conduits located in non-interfering position at the sides of the carriage, the hydraulic controls permitting the cross-beam to be rotated.

23. A car carrier towing apparatus operable between loading and transport positions for transporting a vehicle having front and rear wheels, the vehicle initially positioned rearward of the deck during loading, comprising:

a chassis;

a platform pivotally mounted to and rearwardly extendable from the chassis and including a deck for carrying the vehicle;

a carriage mounted for movement along the platform;

a boom connected to the carriage and positionable rearward of the platform, the boom having a free end for engaging the vehicle during loading at a position rearward of the deck and the carriage;

a first power actuator for extending and pivoting the platform;

a second power actuator for moving the carriage and boom, together with the engaged vehicle, along the platform;

a third power actuator for selectively rotating the boom relative to the platform during movement of the vehicle along the platform; and the vehicle, in the transport position, having front and rear wheels resting on the deck.

24. A car carrier towing apparatus operable between loading and transport positions for transporting a vehicle having front and rear wheels, the vehicle initially positioned rearward of the deck prior to loading, comprising:

a chassis;

a platform pivotally mounted to and rearwardly extendable from the chassis, the platform including a deck for carrying the vehicle and opposing side tracks;

a carriage mounted for movement along the platform, the carriage including at least one crossbeam having rollers at opposite ends for engagement with the side tracks of the platform;

a boom connected to the carriage and positionable rearward of the platform, the boom having a free end for engaging the vehicle during loading at a position rearward of the deck;

a first power actuator for extending and pivoting the platform;

a second power actuator for moving the carriage and boom, together with the engaged vehicle, along the platform;

a third power actuator for selectively rotating the boom relative to the platform during movement of the vehicle along the platform; and hydraulic controls for operating the third power actuator, the hydraulic controls including hydraulic lines housed at least partially within compartments located on opposite sides of the platform.

* * * * *